United States Patent [19]

Uchida et al.

[11] Patent Number: 5,763,978
[45] Date of Patent: Jun. 9, 1998

[54] INSULATING MEMBER FOR A CORE OF A MOTOR

[75] Inventors: Hiroyuki Uchida, Katsuyama-mura; Tomonaga Yamamoto; Takeshi Tamaki, both of Oshino-mura, all of Japan

[73] Assignee: Fanuc Ltd., Yamanashi, Japan

[21] Appl. No.: 737,888

[22] PCT Filed: Apr. 22, 1996

[86] PCT No.: PCT/JP96/01090

§ 371 Date: Dec. 2, 1996

§ 102(e) Date: Dec. 2, 1996

[87] PCT Pub. No.: WO96/33545

PCT Pub. Date: Oct. 24, 1996

[30] Foreign Application Priority Data

Apr. 20, 1995 [JP] Japan ................... 7-095516

[51] Int. Cl.⁶ ................... H02K 3/34
[52] U.S. Cl. ................... 310/215; 310/214; 310/216; 310/254; 310/258
[58] Field of Search ................... 310/214, 215, 310/216, 254, 258; 29/596, 598

[56] References Cited

U.S. PATENT DOCUMENTS

| | | | |
|---|---|---|---|
| 3,735,169 | 5/1973 | Balke et al. | 310/214 |
| 4,025,840 | 5/1977 | Brissey et al. | 322/52 |
| 4,160,926 | 7/1979 | Cope et al. | 310/215 |
| 4,922,165 | 5/1990 | Crawford et al. | 310/215 |

FOREIGN PATENT DOCUMENTS

| | | |
|---|---|---|
| 0 006 514 | 1/1980 | European Pat. Off. . |
| 49-38723 | 10/1974 | Japan . |
| 55-5096 | 1/1980 | Japan . |
| 56-164657 | 12/1981 | Japan . |
| 57-3350 | 1/1992 | Japan . |
| 4-108351 | 9/1992 | Japan . |

*Primary Examiner*—Steven L. Stephan
*Assistant Examiner*—Elvin G. Enad
*Attorney, Agent, or Firm*—Staas & Halsey

[57] ABSTRACT

An insulating member (10), which is disposed in each of slots (20) in a stator core (16) of a motor in order to insulate electrically the core (16) and windings (22) set in the slots (20), comprises a main insulating section 30, which covers the inner wall surface of the slot (20), and auxiliary insulating sections (32) having desired flexibility and flexural repulsiveness to substantially close and opening (26) of the slot. The auxiliary insulating sections (32) are easily deformed to allow the slot opening (26) to open partially when it is subjected to an external force, and are restored to their original state such that the opening (26) is closed when the external force is removed.

8 Claims, 7 Drawing Sheets

INSULATING MEMBER FOR A CORE OF A MOTOR

TECHNICAL FIELD

The present invention relates to an improvement of an insulating member adapted to be disposed in each of a plurality of slots in a stator core of a motor in order to insulate electrically the core and windings set in the slots.

BACKGROUND ART

Figure 9:
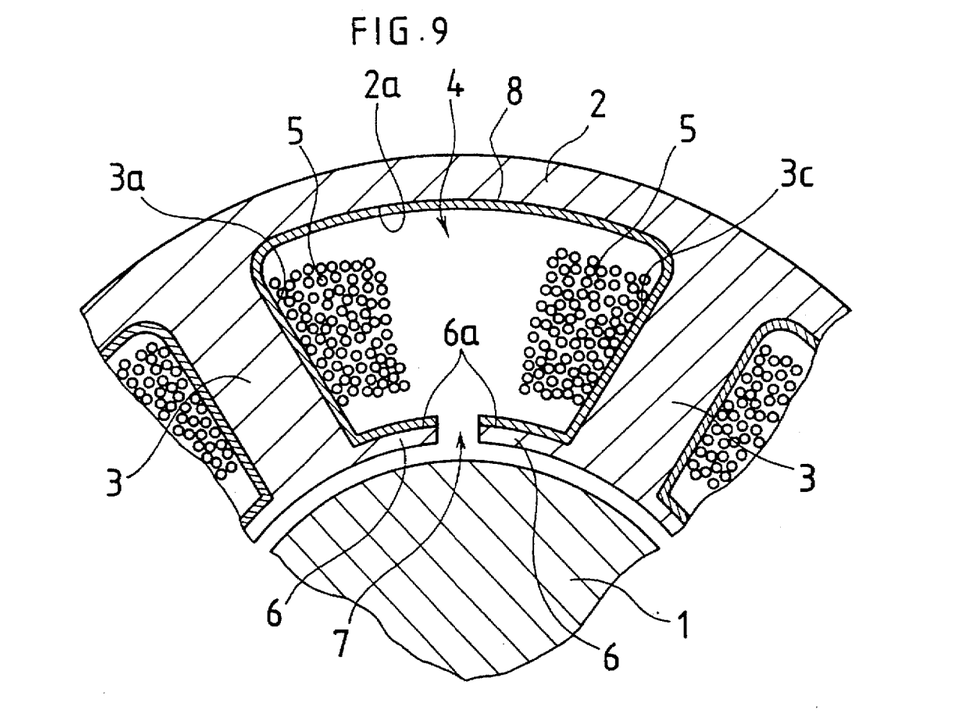
FIG. 9 is a sectional view showing a part of a motor provided with an insulating member of a conventional construction.

It is known in the art that insulating members for electrically insulating a core of a motor and windings are arranged individually in a plurality of winding setting slots in the core. Referring to FIG. 9, therefore, a case will be described in which these insulating members are fitted individually in slots formed in the stator core of a synchronous motor that is frequently used as an AC servomotor.

In FIG. 9, reference numerals 1 and 2 denote a rotor and a stator core of a synchronous motor, respectively. The stator core 2 is formed with a plurality of slots 4 that are arranged at regular intervals in the circumferential direction around the stator axis (in line with the axis of the rotor 1). As a result, radially extending teeth 3 are formed individually between the slots 4, and hooks 6 extend individually from the opposite sides of the distal end portion of each tooth 3 in the circumferential direction. A gap with a fixed width is defined between the extended end of the hook 6 of each tooth 3 and the extended end of the hook 6 of its adjacent tooth 3, and serves as an opening 7 leading to each slot 4. This slot opening 7 is utilized for arranging windings 5 in the slot 4.

Set in these slots 4 are windings 5 that are formed of a plurality of coils arranged according to given rules. The windings 5 are loaded into the slots 4 through the slot openings 7. The hooks 6 prevent the windings 5 from slipping out of the slots 4.

In order to insulate the core and each winding 5 electrically, the inner wall surface of each slot 4 (i.e., inner peripheral surface 2a of the core 2, side face 3a of each tooth 3, and one side face 6a of each hook 6) and the opposite end faces (not shown) of each tooth 3 in the axial direction of the stator are covered by an insulating member 8 that is formed of a molding of an electrically insulating resin material.

In the field of servomotors in recent years, in particular, there have been demands for further reduction in external size and improvement in output. The hooks of the teeth of the core tend to be shortened with increase of the space factor (i.e., ratio of the gross sectional area of each winding to the sectional area of each slot) of the windings arranged in the slots of the core.

Thus, if the aforesaid conventional insulating members are used in the motor constructed in this manner, the electrical insulation distance between each winding and the core (tooth hook in particular) is so short that a satisfactory electrical insulation distance required depending on the working conditions of the motor cannot be secured, in some cases.

Figure 10:
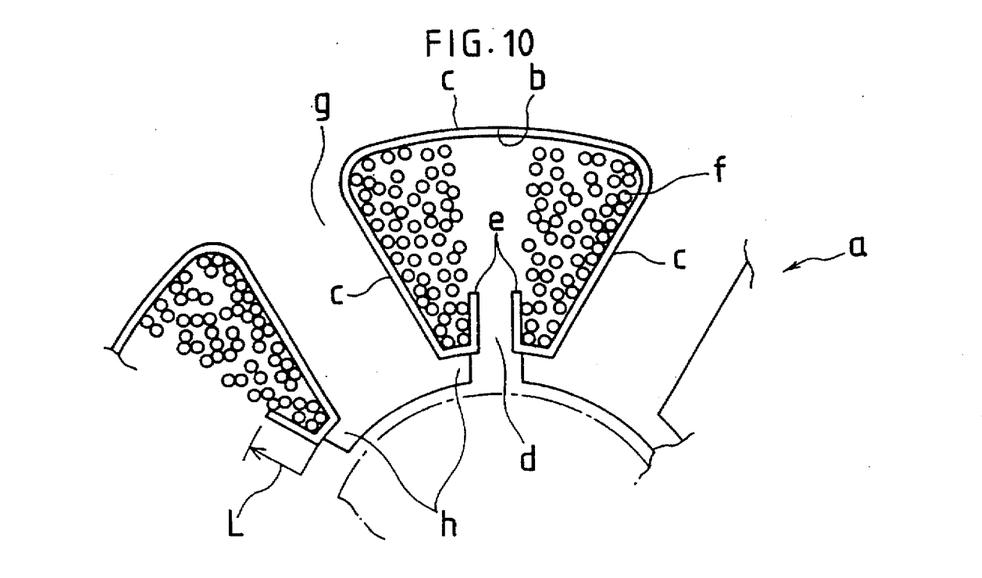
FIG. 10 is a view for illustrating a prior art relevant to the present invention.

In order to solve this problem, an arrangement has been contrived so that one such insulating member is formed including a main insulating section c, which encloses the inside of a slot b of a core a, and screenlike auxiliary insulating sections e, which are formed integrally with the main insulating section c and extend radially into the slot b from an opening d of the slot b, whereby a desired electrical insulation distance L can be secured between each winding f and each hook h of each tooth g of the core a, as shown in FIG. 10, and an application for this arrangement has been filed for a Japanese patent (Serial No. 6-149343; KOKAI Publication No. 8-19202) before the priority date of the present application.

According to this insulating member, even in case the space factor of the windings f is increased or the hooks h of the teeth g of the core a are shortened, the desired electrical insulation distance L can be secured between each winding f and each hook h of each tooth g of the core a by appropriately setting the size of extension of the auxiliary insulating sections e.

However, since the auxiliary insulating sections e serve as circumferential screens for the windings f located in the vicinity of the opening of the slot b, they become obstacles when setting the windings f in the slot b, possibly hindering the arrangement of the windings f in the vicinity of the opening of the slot b. As a result, it may be difficult to increase the space factor of the windings f, or the electrical insulation distance may not be able to be secured due to involvement of the auxiliary insulating sections e with the windings f. These problems are particularly noticeable in the case where the windings f are wound on the teeth g of the core a by using an automatic winding machine.

DISCLOSURE OF THE INVENTION

The object of the present invention is to provide an insulating member for a core of a motor, capable of securing an electrical insulation distance between each winding and a core without hindering operation for installing windings, thereby contributing to dimensional reduction of motors and development of motors capable of providing higher output.

In order to achieve the above object of the present invention, an insulating member of a core of a motor, which electrically insulates a core of a stator of a motor, where the core of the stator is formed with a plurality of sets of slots and slot openings arranged in the circumferential direction thereof forming the teeth between the adjacent slots, from the windings set in the slots, comprises a main insulating section having boundary lines on either side thereof and a region capable of substantially covering the whole inner wall surface of a slot extending parallel to the axial direction of the stator by extending substantially parallel to the axial direction of the stator, and auxiliary insulating sections integrally extending from the individual boundary lines on either side of the main insulating section, in directions perpendicular to the axial direction of the stator, and having the respective distal end edges thereof butting on or overlapping each other in the center of the slot opening, thereby substantially closing the slot opening, and moreover, the auxiliary insulating sections is formed of a material such that a region thereof or a region in the vicinity thereof is deformed to open the slot opening partially when an external force of a magnitude not lower than a predetermined level is applied to the region and is restored to the original posture thereof to close the slot opening when the external force is removed.

The auxiliary insulating sections, which is capable of closing the opening of each slot, substantially close the opening of the slot that is defined between the respective distal end portions of the adjacent teeth, thereby securing an electrical insulation distance between each winding and the core. Having desired flexibility and flexural repulsiveness, moreover, the auxiliary insulating sections can easily be deformed to allow the slot opening to open when the winding is to be set in the slot, thereby permitting installa-

3 tion operation. After the operation is finished, the auxiliary insulating sections are restored to their original shape to close the opening, thereby maintaining the electrical insulation distance.

BEST MODE OF CARRYING OUT THE INVENTION

Figure 1:
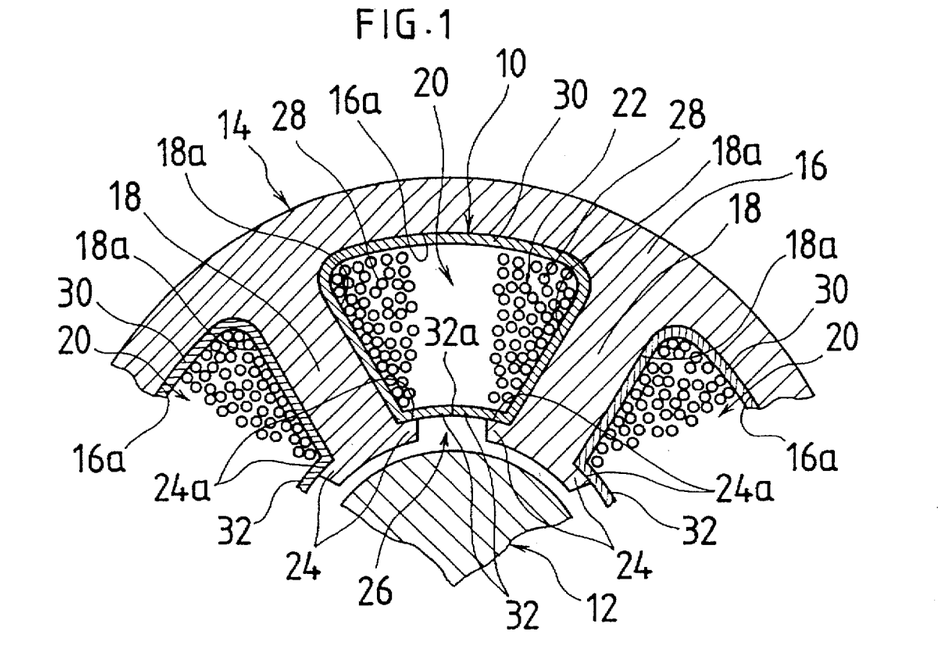
FIG. 1 is a sectional view showing a core of a motor provided with an insulating member according to a first embodiment of the present invention.
Figure 2:
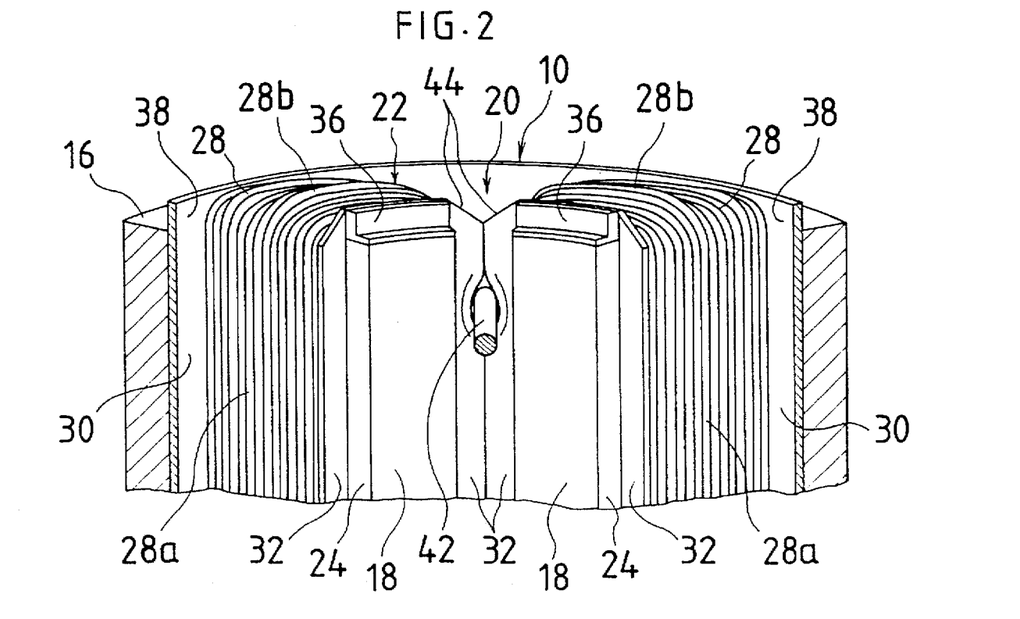
FIG. 2 is a perspective view showing a part of a stator of the insulating member of FIG. 1.
Figure 3:
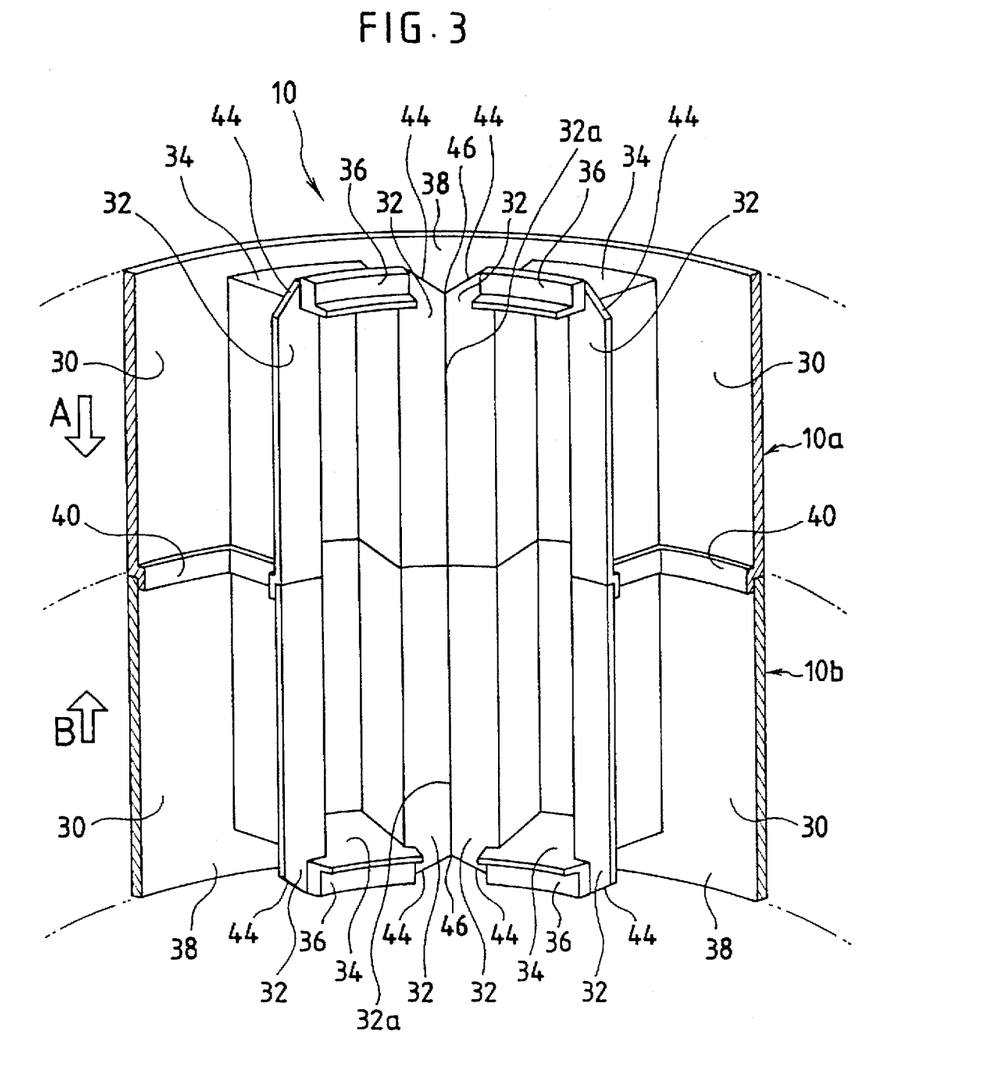
FIG. 3 is a perspective view showing a part of the insulating member of FIG. 1.

Referring first to FIGS. 1 to 3, an arrangement of an insulating member according to one embodiment of the present invention will be described.

In FIG. 1, a rotor 12 of a synchronous motor is surrounded by a stator 14 with a gap between them. The stator 14 is provided with a cylindrical stator core 16, which is formed of a laminate of magnetic metal sheets such as silicon steel sheets. The stator core 16 is formed with a plurality of slots 20 that are arranged at regular intervals in the circumferential direction around the stator axis (in line with the axis of the rotor 12). As a result, radially extending teeth 18 are formed, individually between the slots 20 and their adjacent slots 20, and hooks 24 are formed extending individually from the opposite sides of the distal end portion of each tooth 18 in the circumferential direction. A gap with a fixed width is defined between the extended end of the hook 24 of each tooth 18 and the extended end of the hook 24 of its adjacent tooth 18, and serves as an opening 26 leading to the slot 20. This slot opening 26 is utilized for arranging windings 22 in the slot 20.

Set in these slots 20 are windings 22 that are formed of a plurality of coils 28 arranged according to given rules. The windings 22 are loaded into the slots 20 through the slot openings 26. The hooks 24 prevent the windings 22 from slipping out of the slots 20.

FIG. 2 shows a state in which each tooth 18 of the stator core 16 is wound with one coil 28 to which a three-phase AC voltage is applied. Thus, each slot 20 of the stator core 16 contains both a portion 28a of one coil 28, which is wound on the tooth 18 on one side (left-hand side in FIG. 2) of the slot 20, and a portion 28a of another coil 28, which is wound on the tooth 18 on the other side (right-hand side in FIG. 2). However, the way of winding the coil 28 on the tooth 18 is not limited to the one shown in FIG. 2, and the coil 28 sometimes may be wound astride a plurality of teeth 18. The present invention is also applicable to this case.

The stator core 16 and the windings 22 are electrically insulated from one another by means of insulating members 10 that are formed of an electrically insulating resin material such as polyester. Each insulating member 10 includes a main insulating section 30 having boundary lines (not shown) on either side thereof and a region that directly covers the inner wall surface of one slot 20 by extending substantially parallel to the axial direction of the stator, and auxiliary insulating sections 32 integrally extending for a predetermined length from the individual boundary lines on either side of the main insulating section 30, in directions perpendicular to the axial direction of the stator, thereby substantially closing the slot opening 26.

Specifically, the main insulating section 30 of the insulating member 10 is constructed so as to cover each of inner peripheral surfaces 16a of the stator core 16, respective one of the side faces 18a and 18a of each of two adjacent teeth 18, 18, and one of the side faces 24a of the hooks 24, 24 that are connected to the side faces 18a, 18a, individually. The boundary lines on either side of the main insulating section 30 are situated substantially in line with the respective extended distal end edges of the hooks 24, 24. On the other hand, the respective proximal end edges of the auxiliary insulating sections 32, 32 (which are individually in line with the boundary lines of the main insulating section 30) are substantially in line with the extended distal end edges of the hooks 24, 24, and the distal end edges thereof abut on or overlap each other in the center of the slot opening 26, thereby substantially closing the slot opening 26.

Further, the auxiliary insulating sections 32 have flexibility such that they can be deformed relatively easily by an external force and flexural repulsiveness such that they can be restored relatively quickly to their original shape after deformation. Thus, in storing each winding 22 in the slot 20, it is necessary only that a part of the junction between the auxiliary insulating sections 32, 32, which close the slot opening 26, be deformed by the external force so that a gap leading to the slot 20 is formed. If the external force is removed, the auxiliary insulating sections 32, 32 are restored to their original state in which they close the slot opening 26.

As shown in FIGS. 2 and 3, moreover, each insulating member 10 includes covering sections 34, which directly cover the opposite end faces of the teeth 18 in the axial direction of the stator, and inside winding support portions 36 and an outside winding support portion 38, as well as the above- described main insulating section 30 and the auxiliary insulating sections 32, 32 integral therewith. The inside winding support portions 36 extend toward the axis of the rotor from the main insulating section 30 and the covering sections 34, in order to secure an insulation distance between a coil end 28b of each coil 28 and the core 16 at the distal and proximal end portions of each tooth 18.

The insulating member 10 can be obtained by integrally forming all of the main insulating section 30, auxiliary insulating sections 32, covering sections 34, inside winding support portions 36, and outside winding support portion 38, from a resin material such as polyester by a molding method such as injection molding. Such one-piece molding of the insulating member 10 is desirable in view of the simplicity of manufacturing processes and reduction of the manufacturing costs. In this case, the auxiliary insulating section 32 of the insulating member 10 thus formed is divided into two parts, namely, left- and right-hand auxiliary insulating sections 32, 32, by undergoing a cutting process after molding, for example, so that their respective cut end edge portions 32a, 32a are substantially in contact with each other in a normal state.

The insulating member 10 obtained by such one-piece molding, as shown in FIG. 3, comprises one cylindrical section (defined by chain lines in FIG. 3), which is formed of a part of the main insulating section 30 and the outside winding support portion 38, and the remaining parts of the main insulating section 30, which are formed corresponding to the number of the slots 20 and inside the cylindrical section. Further, the insulating member 10 comprises the auxiliary insulating sections 32, covering sections 34, and inside winding support portions 36.

Actually, however, each insulating member 10 including these cylindrical sections is divided into two units 10a and 10b (upper and lower units in FIG. 3) along an intermediate line perpendicular to the axial direction of the cylinder, as shown in FIG. 3, in order to permit mounting on the stator core 16. The upper unit 10a is fitted downward (in the direction of arrow A in FIG. 3) into the stator core 16 from any upper position on the upper end face of the stator core 16, while the lower unit 10b is fitted upward (in the direction of arrow B in FIG. 3) into the stator core 16 from any lower position on the lower end face of the stator core 16.

A butting end portion of the upper unit 10a forms an overlapping portion 40, which is slightly bent towards the slot space side, so that the respective butting portions of the upper and lower units 10a and 10b overlap each other covering a predetermined width in the whole circumference. As the upper end portion of the lower unit 10b is fitted into the overlapping portion 40 of the upper unit 10a, a break of the electrical insulation can be prevented.

Figure 4A:
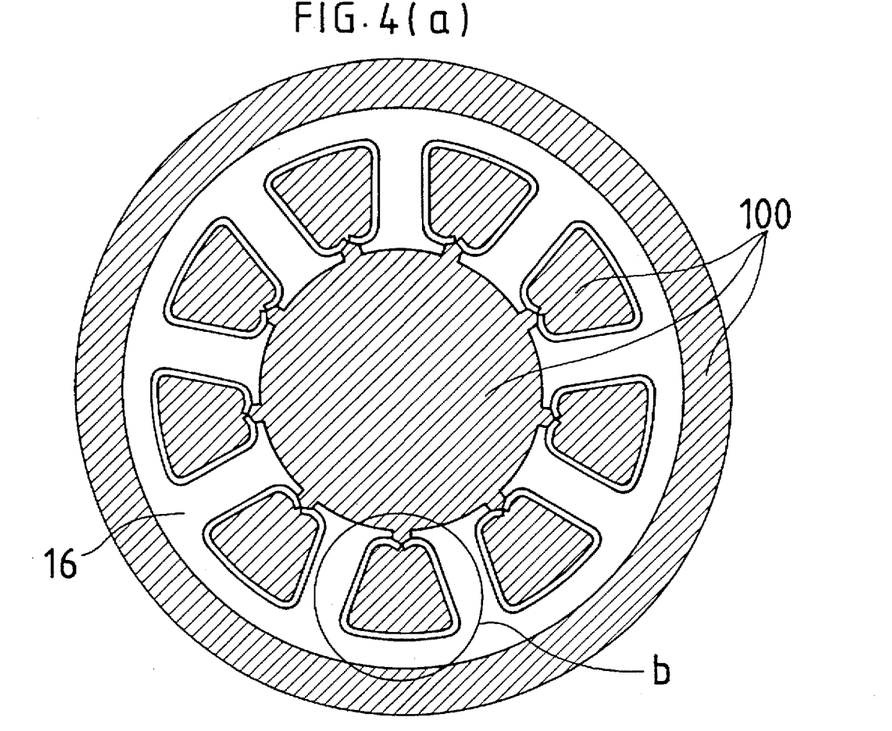
FIG. 4(a) is a sectional view showing a mold for forming a modification of the insulating member of FIG. 1 integrally with the stator core, together with the stator core and the insulating member.
Figure 4B:
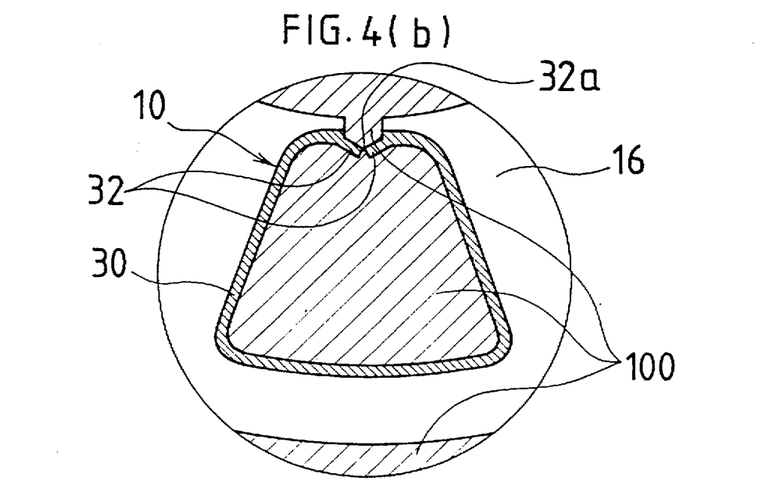
FIG. 4(b) is an enlarged view of a portion enclosed with a circle D of FIG. 4(a)

Referring now to FIGS. 4(a) and 4(b), another example that replaces the example of one-piece molding of the insulating member 10 (upper and lower units 10a and 10b) explained with reference to FIG. 3 will be described.

According to this example of molding, the stator core 16 is first disposed as an insert in a desired mold 100. Then, the resin material is injected along a desired surface (e.g. inner wall surface of slot) of the stator core 16 and solidified, whereupon the insulating member 10 is formed integrally with the stator core 16. In this case, the mold 100 is constructed, for example, as a movable integral mold so that the stator core 16 can be inserted into a space formed by the mold 100 after the mold 100 is moved in the axial direction. When the molding of the insulating member 10 by means of the mold 100 is completed, the movable mold 100 is moved in the axial direction to be disengaged from the stator core 16.

Both the auxiliary insulating sections 32 of the insulating member 10, as is specifically shown in FIG. 4(b), are molded with a slight inclination toward the inner part of each slot 20 of the stator core 16, and are finely joined with each other at their respective end edge portions 32a immediately after the molding. This fine junction can easily be broken when the winding 22 is set. According to this molding method, a process for attaching the insulating member 10 to the stator core 16 can be omitted, and the insulating member 10 need not be divided into two units.

According to the insulating members 10 formed by the example of molding described above with reference to FIG. 3 and the example of molding described with reference to FIGS. 4(a) and 4(b), the slot opening 26 is substantially closed by the auxiliary insulating sections 32. Thus, even in a small-sized motor including windings 22 with a high space factor, a sufficient electrical insulation distance can be secured between each winding 22 and the stator core 16 (tooth hook in particular), depending on the working conditions of the motor. Moreover, both the auxiliary insulating sections 32, 32 that close the slot opening 26 are deformed relatively easily, and can be restored relatively quickly to their original shape. Accordingly, in inserting a nozzle 42 of an automatic winding machine into each slot 20, as shown in FIG. 2, for example, both the auxiliary insulating sections 32, 32, which close the slot opening 26, are easily deformed by the inserted nozzle 42, thereby allowing the passage of the nozzle 42 and subsequent winding operation for the windings 22. In this case, these auxiliary insulating sections 32, 32 will not hinder each winding 22 from being installed in the vicinity of the hooks 24 of the teeth 18, in particular, so that the space factor of the windings 22 can be improved.

After the nozzle 42 passes the junction between the auxiliary insulating sections 32, 32, both the auxiliary insulating sections 32, 32 are restored to their original shape, thereby closing the slot opening 26, so that the electrical insulation distance can be maintained. In inserting form-wound coils into-the slots 20 in order to wind each coil 28 astride a plurality of teeth 18, 18, . . . , as well as in the case where the automatic winding machine is used, both these auxiliary insulating sections 32, 32 are easily deformed, thereby partially releasing the slot opening 26 from the closed state or restoring it to the original closed state. Thus, these auxiliary insulating sections 32, 32 can secure the desired electrical insulation distance without hindering the operation for installing the coils 28 that constitute the windings 22.

Preferably, the opposite end portions (upper and lower end portions in FIG. 3) of each auxiliary insulating section 32 in the axial direction of the stator are provided with a diagonally-cut slanting edge portion 44 each, and are connected individually to the inside winding support portions 36. The nozzle 42 of the automatic winding machine is situated in a V-shaped recess that is defined by the slanting edge portions 44 of one auxiliary insulating section 32 and the slanting edge portions 44 of the other auxiliary insulating section 32 that intersect one another. When the nozzle 42 is then urged to move toward the central position of the respective end edge portions 32a of the auxiliary insulating sections 32 along the end edge portions 32a, the slanting edge portions 44, 44 of the two auxiliary insulating sections 32, 32 are first easily deformed by the nozzle 42, thereby facilitating penetration of the nozzle 42 into the space between the respective end edge portions 32a of the auxiliary insulating sections 32. The point of intersection between each slanting edge portion 44 and the end edge portion 32a of each auxiliary insulating section 32 in the circumferential direction of the stator must be settled in consideration of the angle of inclination of the slanting edge portion 44 lest it be situated inside the level of the end face (in the axial direction of the stator) of each tooth 18 of the stator core 16 (on the side of the level of the other end face) with respect to the axial direction of the stator, in order to secure the electrical insulation distance in the vicinity of the point.

It is to be understood that the technical idea of the present invention to close substantially the opening of each winding setting slot in the core by means of the auxiliary insulating sections of each insulating member that have desired flexibility and flexural repulsiveness is not limited to the stator of a synchronous motor, such as the one according to the foregoing embodiment, and may be applied to the cores of various other motors having windings, such as the armature of a DC machine, stator of an induction machine, etc.

Figure 5A:
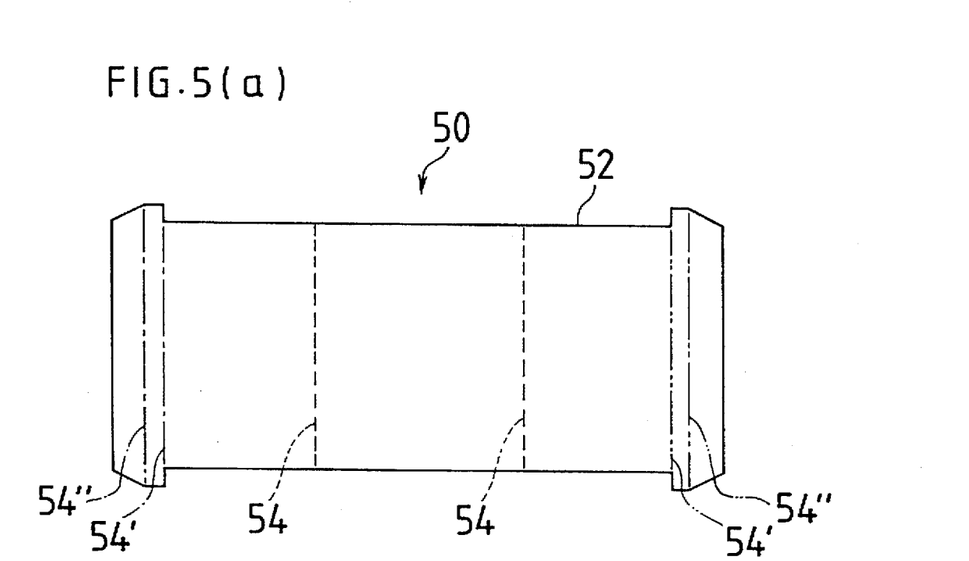
FIG. 5(a) is a plan view of a blank obtained by punching an insulating sheet to form an insulating member according to another embodiment of the present invention.
Figure 5B:
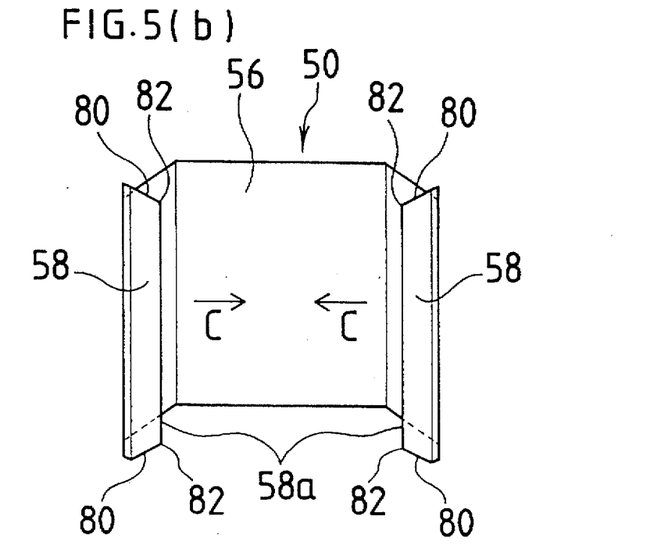
FIG. 5(b) is a view showing the way the blank of FIG. 5(a) is folded to form the insulating member.

Referring now to FIGS. 5(a) and 5(b), an insulating member 50 according to another embodiment of the present invention will be described. This insulating member 50 is formed of a blank 52 in the shape shown in FIG. 5(a) punched out of one insulating sheet, such as resin-impregnated insulating paper. The blank 52 is folded inward along broken lines 54, 54' and 54", as indicated by arrow C in FIG. 5(b). The insulating member 50 thus folded includes a central main insulating section 56 surrounded by the broken lines 54" and auxiliary insulating sections 58 or regions between the broken lines 54" and the end portions on either side of the main insulating section 56. Thus, the broken lines 54" correspond to the boundary lines between the main insulating section and the auxiliary insulating sections.

The insulating sheet suitably used for the insulating member 50 may be insulating paper impregnated with a resin, such as polyethylene naphthalate, polyester, polyphenylene sulfide, etc.

Figure 6:
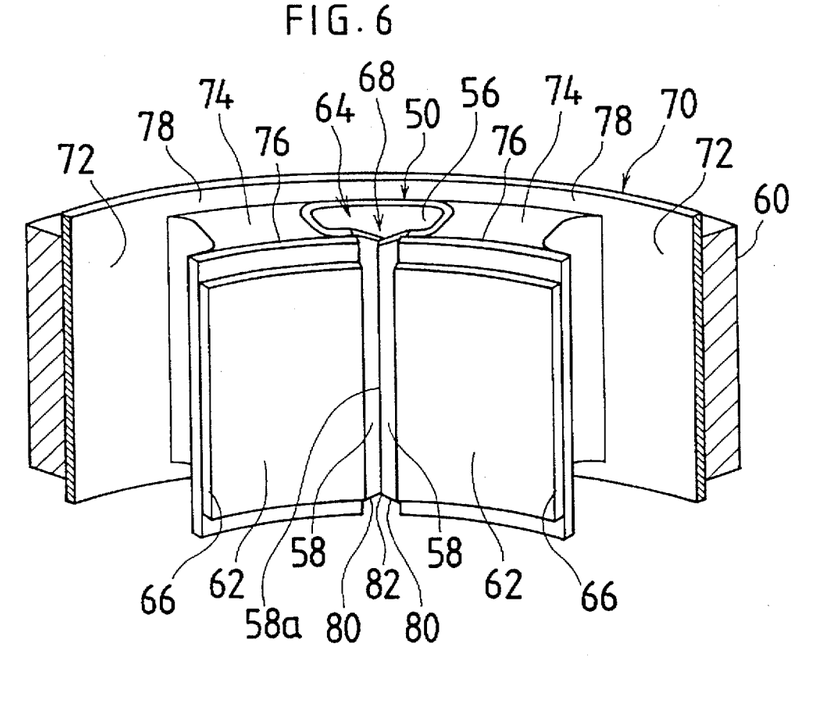
FIG. 6 is a perspective view showing a part of a stator of a motor provided with the insulating member of FIG. 5(b), without showing windings.
Figure 7:
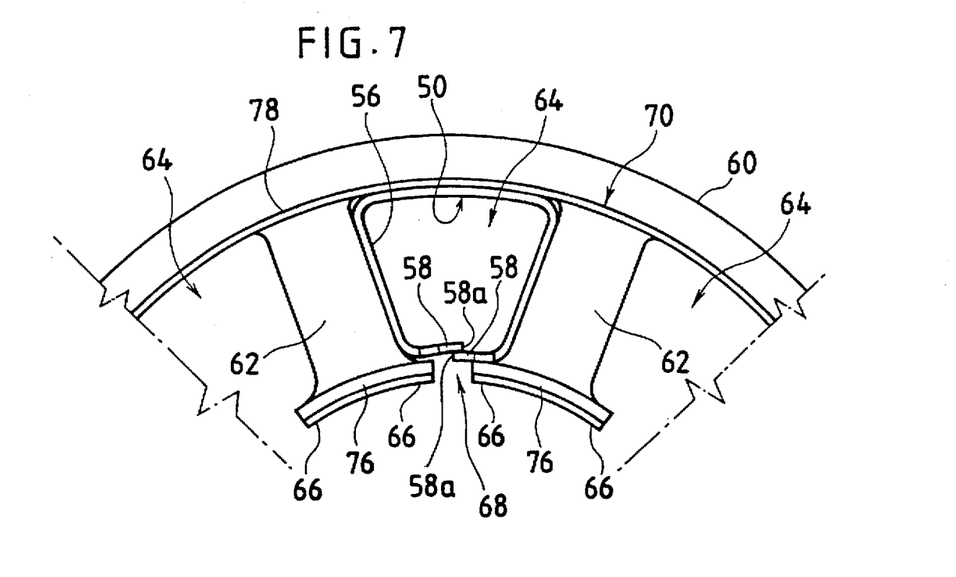
FIG. 7 is a top view of the stator of FIG. 6.
Figure 8:
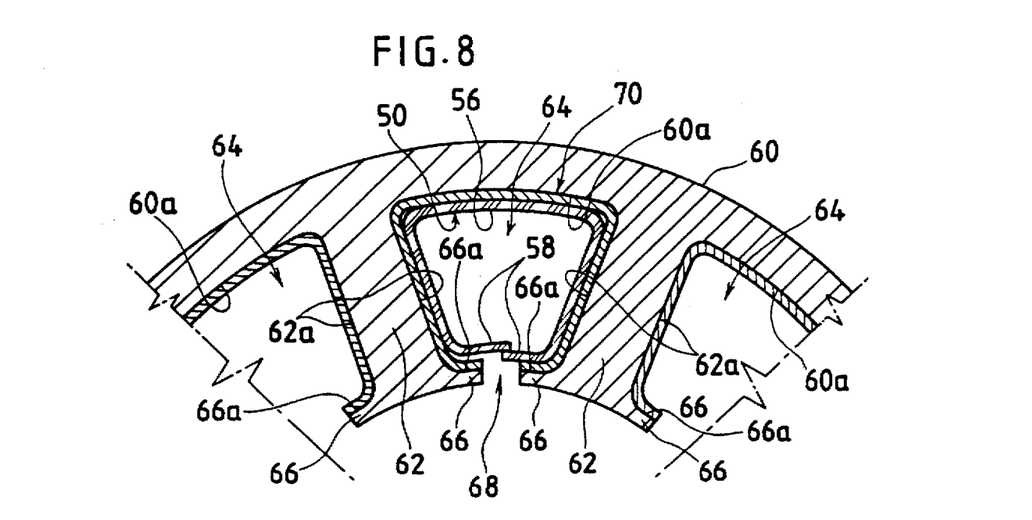
FIG. 8 is a sectional view of the stator of FIG. 6.

FIGS. 6 to 8 show a case in which the insulating member 50 of FIG. 5(b) is fitted with a stator core 60 of a motor. The stator core 60, like the stator core 16 of FIG. 1, is formed with a plurality of slots 64 that are arranged at regular intervals in the circumferential direction around the stator axis. As a result, radially extending teeth 62 are formed individually between the slots 64 and their adjacent slots 64, and hooks 66, 66 extend individually from the opposite sides of the distal end portion of each tooth 62 in the circumferential direction. A gap with a fixed width is defined between the extended end of the hook 66 of each tooth 62 and the extended end of the hook 66 of its adjacent tooth 62, and serves as an opening 68 leading to the slot 64.

Further, the stator core 60 is provided with an insulating layer 70, which, like the insulating member 8 with the conventional construction shown in FIG. 9, is formed of a resin molding. The insulating layer 70 is provided with a main insulating section 72, which directly covers the inner wall surface of each slot 64 (i.e., inner peripheral surface 60a of the stator core 60, side face 62a of each tooth 62, and one side face 66a of each hook 66), covering sections 74, which directly cover the opposite end faces of the teeth 62 in the axial direction of the stator, and inside winding support portions 76 and an outside winding support portion 78, the inside winding support portions 76 extending in the axial direction from the main insulating section 72 and the covering sections 74 so as to secure an insulation distance between each winding and the core 60 at the distal and proximal end portions of each tooth 62. Further, the insulating layer 70 is formed as a cylindrical component extending in the circumferential direction from the configuration shown in FIG. 6 and integral with the stator core 60, for example.

The insulating member 50 is folded in the manner shown in FIG. 5(b) as it is inserted axially into each slot 64 of the stator core 60 that is fitted with the insulating layer 70. FIGS. 6 to 8 show a state in which the insulating member 50 is disposed in only one slot 64, for ease of illustration. With the insulating member 50 inserted in the slot 64, the main insulating section 56 is put on the main insulating section 72 of the insulating layer 70 substantially in alignment therewith, thereby covering the inner wall surface of the slot 64 (i.e., inner peripheral surface 60a of the stator core 60, side face 62a of each tooth 62, and one side face 66a of each hook 66) indirectly (i.e., across the insulating layer 70).

The auxiliary insulating sections 58 of the insulating member 50 extend toward each other from the opposite edge regions of the main insulating section 56 that are arranged individually on the opposite hooks 66 of the adjacent teeth 62, and substantially close the opening 68 of the slot 64. In this state, the two auxiliary insulating sections 58, which extend toward each other, are substantially in contact with each other in the near center of the opening 68, preferably slightly overlapping each other (see FIG. 7), at their respective end edge portions 58a, 58a covering the overall length in the axial direction of the stator.

The insulating member 50, which is formed of an insulating sheet, has flexibility such that it can be deformed relatively easily by an external force and flexural repulsiveness such that it can be restored relatively quickly to its original shape after deformation. Thus, if the insulating member 50, folded in a shape such that both the auxiliary insulating sections 58 are opened wider than when located in the slot, as shown in FIG. 5(b), is inserted into the slot 64 with the two auxiliary insulating sections 58 elastically deformed so as to approach each other, the insulating member 50 can be kept in the slot 64 by its own elastic restoring force. Moreover, the auxiliary insulating sections 58, like the auxiliary insulating sections 32 of the insulating member 10 shown in FIG. 2, are deformed to allow the opening 68 to open, thereby permitting winding operation for the windings, as the nozzle of the automatic winding machine can be inserted into the slot 64. After the passage of the nozzle, the auxiliary insulating sections 58 are restored to their original shape to close the opening 68, thereby maintaining the electrical insulation distance.

Preferably, the opposite end portions of each auxiliary insulating section 58 in the axial direction of the stator are provided with a diagonally-cut slanting edge portion 80 each. The slanting edge portions 80 make the deformation of the auxiliary insulating sections 58 easier as the nozzle of the automatic winding machine is introduced into the slot 64 The point of intersection between each slanting edge portion 80 and the end edge portion 58a of each auxiliary insulating section 58 in the circumferential direction must be settled in consideration of the angle of inclination of the slanting edge portion 80 lest it be situated inside the level of the end face (in the axial direction of the stator) of each tooth 62 of the stator core 60 (on the side of the level of the other end face) with respect to the axial direction of the stator, in order to secure the electrical insulation distance in the vicinity of the point.

According to the insulating member 50 having the construction described above, a satisfactory electrical insulation distance can be secured between each winding and the core (tooth hook in particular) even in a small-sized motor including windings with a high space factor, matching with the working conditions of the motor, by only inserting the insulating member 50, which is composed of the insulating sheet formed and folded in separate processes, into a slot of the core having the conventional insulating structure. Furthermore, owing to the flexibility and flexural repulsiveness of the insulating sheet, the winding operation for the windings can be carried out without hindrance.

According to the present invention, as is evident from the above description, the use of the insulating member, which includes the main insulating section covering the wall surface of each slot and the auxiliary insulating sections having the desired flexibility and flexural repulsiveness and substantially closing the opening of the slot, ensures the maintenance of the electrical insulation distance between each winding and the core without hindering the installation of the windings. Thus, according to the present invention, a satisfactory electrical insulation distance can be secured between each winding and the core even in a small-sized motor including windings with a high space factor, matching with the working conditions of the motor, so that miniaturization of motors and development of higher-output motors can be promoted.

We claim:

1. A single insulating member for a core of a motor, the single insulating member electrically insulating a stator core of the motor, formed with a plurality of sets of slots and slot openings arranged in a circumferential direction thereof so that teeth are formed between the adjacent slots, and windings are set in the slots, comprising:

n main insulating sections which have boundary lines on either side thereof, extending substantially parallel to the axial direction of the stator, and a region capable of covering the whole inner wall surface of a slot extending parallel to the axial direction of the stator; and n auxiliary insulating sections integrally extending from said individual boundary lines on either side of each of the main insulating sections, in directions perpendicular to the axial direction of the stator, and having the respective distal end edges thereof butting on or overlapping each other in the center of the slot opening, thereby substantially closing said slot opening, wherein said n auxiliary insulating sections are formed of a material such that a region thereof or a region in the vicinity thereof is deformed to open the slot opening partially when an external force of a magnitude of at least a predetermined level is applied to the region and is restored to the original form thereof to close the slot opening when the external force is removed, and wherein n is equal to the number of slots in the core.

2. A single insulating member for a core of a motor according to claim 1, wherein said main insulating sections cover an inner peripheral surface of the core, side faces of the teeth, and respective inner surfaces of hoods projecting individually from the opposite sides of the respective distal ends of the teeth in the circumferential direction around an axis of a rotor which comprise the inner wall surface of the slot, and said boundary lines on both sides defining regions for the main insulating sections, being substantially in line with the positions of the respective distal end edges of said hooks, so that proximal end edges of the auxiliary insulating sections, extending individually from said boundary lines on both sides of the main insulating section, are substantially in line with positions of respective distal end edges of said hooks.

3. A single insulating member for a core of a motor according to claim 2, wherein one electrically insulating sheet having a desired shape is formed into said main insulating sections and said auxiliary insulating sections by previously folding the sheet along folding lines on the sheet, extending parallel to the axial direction of the stator, and then inserting the sheet into the slot.

4. A single for a core of a motor according to claim 1, wherein the opposite end portions of each said auxiliary insulating section in the axial direction of the stator are provided with a diagonally-cut slanting edge portion, whereby a V-shaped hollow is defined by the slanting edge portion of one auxiliary insulating section and the slanting edge portion of the other auxiliary insulating section, closing the opening of the slot.

5. A single insulating member for a core of a motor according to claim 1, wherein said insulating member is composed of a pair of cylindrical structures, each cylindrical structure including a cylindrical body and attachments integrally connected to the cylindrical body so as to form all elements of the insulating member including the main insulating section and the auxiliary insulating sections, and each of these cylindrical structures is caused to engage with the stator core from different directions so that an end edge portion of one cylindrical structure comes into contact with the end of another cylindrical structure to form the insulating member.

6. A single insulating member for a core of a motor according to claim 5, wherein the end edge portion of one cylindrical structure is formed along the whole circumference thereof with a bent portion covering which can receive the end edge portion of the one cylindrical structure and the end edge portion of other cylindrical structure overlap each other at the ben portion.

7. A method for forming an insulating member for a motor core, comprising:

(a) locating a stator core of a motor, which is formed with a plurality of sets of slots and slot openings arranged in a circumferential direction, as an insert in a mold so that annular spaces are defined between the mold and the stator core, along respective inner peripheral walls of the individual slots and an inside of the slot openings continuous therewith;

(b) forming an insulating member integrally with the stator core by injecting a resin material into each of said defined annular spaces and solidifying the material; and (c) rupturing, along the axial direction of the stator core, the portion of said insulating member which faces the inside of the slot opening when setting windings in the stator core.

8. A method for forming an insulating member for a motor core according to claim 7, wherein the portion of each said annular space defined in said (a) which faces the inside of the slot opening is made adequately narrower than that portion which faces the inner peripheral wall of the slot, whereby the portion of said insulating member which faces the inside of the slot opening is thin enough to be ruptured easily.

* * * * *

UNITED STATES PATENT AND TRADEMARK OFFICE
CERTIFICATE OF CORRECTION

PATENT NO. : 5,763,978
DATED : June 9, 1998
INVENTOR(S) : Uchida et al.

It is certified that error appears in the above-identified patent and that said Letters Patent is hereby corrected as shown below:

Abstract [57], line 4, "30" should be --(30)--;

line 7, "and" should be --an--.

Col. 3, line 51, after "formed" delete ",".

Col. 4, line 55, "above- described" should be --above-described--.

Col. 5, line 11, "one piece" should be --one-piece--;
line 26, "i6" should be --16--.

Col. 6, line 28, "into-the" to --into the--.

Col. 10, [Claim 4], line 1, after "single" insert --insulating member--.

Col. 10, [Claim 6], line 7, change "ben" to --bent--.

Signed and Sealed this

First Day of December, 1998

Attest:

Attesting Officer

BRUCE LEHMAN
Commissioner of Patents and Trademarks